United States Patent [19]

Jansen et al.

[11] Patent Number: 5,297,886
[45] Date of Patent: Mar. 29, 1994

[54] CONNECTOR BRACKET

[75] Inventors: James M. Jansen; Simon J. Cooke; Kym Males, all of Richmond, Australia

[73] Assignee: Stratco (Australia) Pty Limited, Richmond, Australia

[21] Appl. No.: 979,159

[22] Filed: Nov. 20, 1992

[30] Foreign Application Priority Data

Nov. 20, 1991 [AU] Australia .................. PK9584

[51] Int. Cl.⁵ .................................................. F16B 7/00
[52] U.S. Cl. ................................. 403/232.1; 403/302; 403/305; 403/308
[58] Field of Search ............... 403/232.1, 305, 308, 403/301, 302, 189, 10, 23, 11

[56] References Cited

U.S. PATENT DOCUMENTS

| | | | |
|---|---|---|---|
| 3,136,530 | 6/1964 | Case | 403/189 X |
| 3,969,031 | 7/1976 | Kroopp | 403/239 |
| 4,285,610 | 8/1981 | Rusch | 403/189 |
| 5,134,812 | 8/1992 | Hoffman et al. | 403/305 X |

FOREIGN PATENT DOCUMENTS 2647861 12/1990 France .................. 403/232.1

*Primary Examiner*—Randolph A. Reese
*Assistant Examiner*—Christopher J. Novosad
*Attorney, Agent, or Firm*—Edward W. Callan

[57] ABSTRACT

A U-shaped connector bracket connects an end of a first tubular frame member to a second frame member having two opposite sides and a pair of elongate recesses respectively located in and extending along the two opposite sides. The connector bracket has a pair of side arms, an end member extending between a first end of each side arm at a dependent end of the bracket, and projections at a second end of each side arm that are directed inwardly towards one another. The dependent end of the connector bracket is adapted for insertion within the end of the first tubular frame member. The projections from the side arms secure the connector bracket to the opposite sides of the second frame member by being located within a respective recess of the second frame member.

6 Claims, 1 Drawing Sheet

U.S. Patent    Mar. 29, 1994    5,297,886
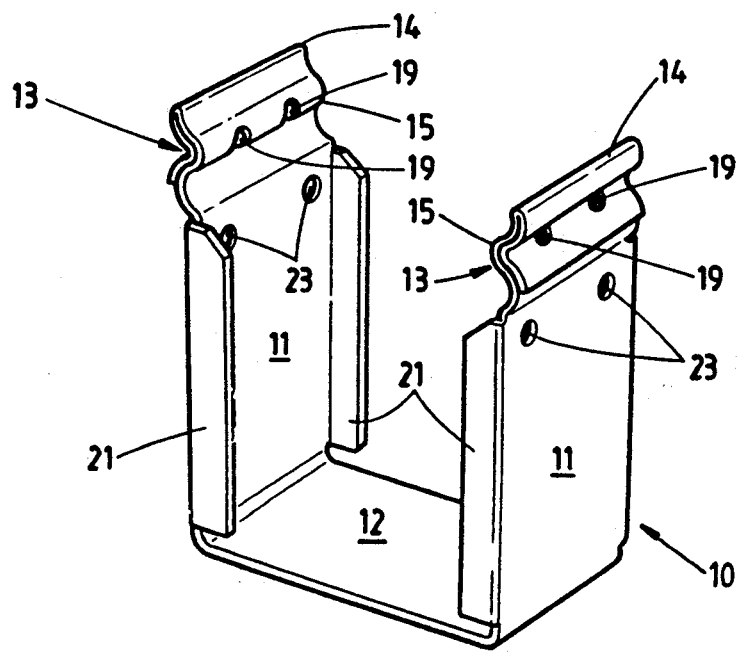
FIG 1
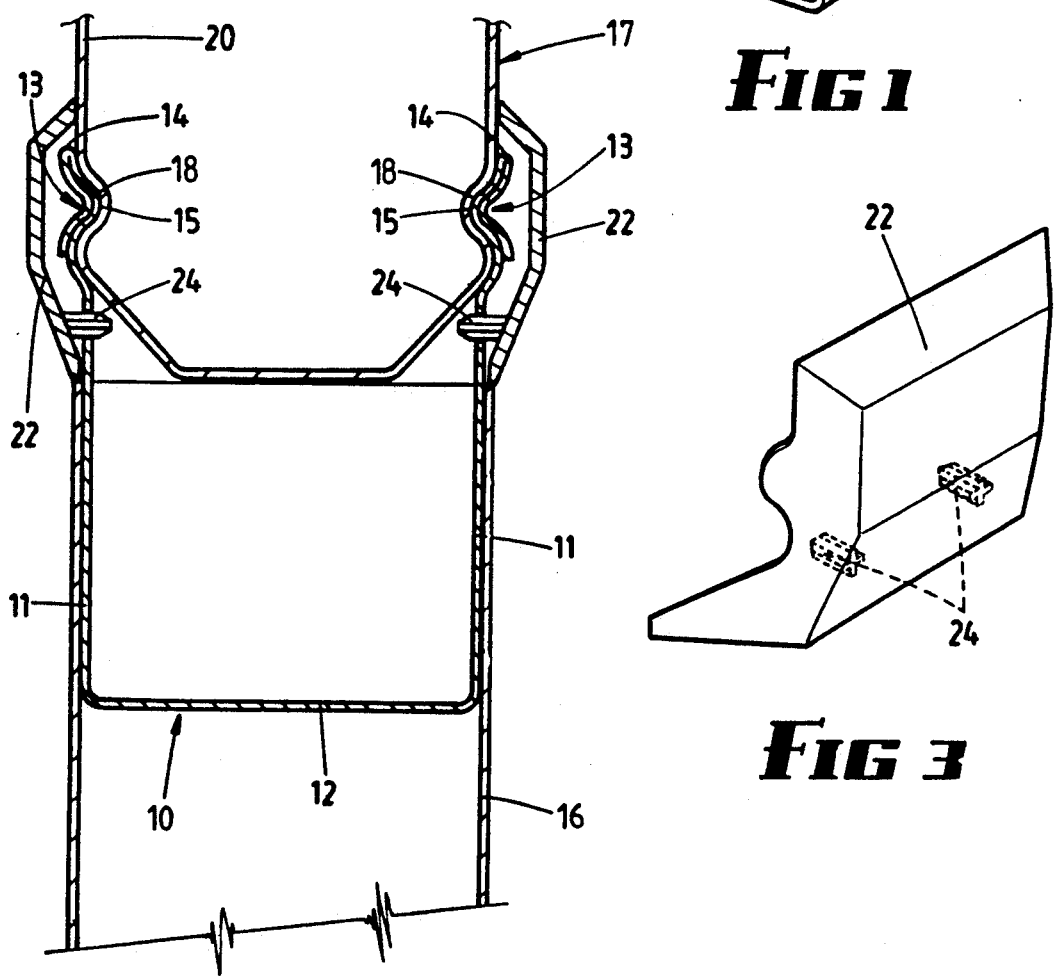
FIG 2
FIG 3

CONNECTOR BRACKET

This invention relates to a connector bracket and in particular to a bracket which is capable of connecting the end of a first tubular frame member to a second frame member.

In the building industry, particularly with the use of tubular metal sections or rollformed metal sections, there is a need to provide a means of forming joints between frame members, particularly where the end of one frame member is abutting against the edge of another. Examples of such joints are found where posts are secured to beams or rafters, or where bracing members are located between adjacent posts.

In the past, depending on the type of building element or frame member being used, it has been common to make use of separate right angle brackets which are fastened to the exterior surface of the adjacent frame members. This fastening includes the use of threaded fasteners or rivets, and obviously a great deal of skill and time is required to position the brackets accurately to ensure correct fitment between the frame members. In addition, the process is time consuming and produces an unsightly result.

Another alternative is the use of a U-shaped bracket having a pair of side arms and an end member extending between the side arms. The end member is secured to a side of one of the frame members, and the arms are located within the end of a tubular frame member. Although such an arrangement produces a joint having a neat appearance, when threaded fasteners are used to secure the tubular frame member to the arms of the U-shaped bracket, there is a tendency for the arms to deflect inwardly, particularly when self-tapping and self-drilling threaded fasteners are used. A still further problem with such a bracket is that it is inherently weak, in that the bracket will readily deform at the fold lines formed between the side arms and the end member.

Therefore, it is an object of this invention to provide a bracket that is capable of being secured to frame members and other building members which is quick and easy to use, and which provides a positive location that ensures structural integrity and correct positioning of the bracket and associated frame members.

In its broadest form, the connector bracket for connecting an end of the first tubular frame member to a second frame member comprises a generally U-shaped bracket having a pair of parallel side arms and an end member extending between a first end of each said side arm and coupling means at a second free end of each said side arm that are locatable either side of the second frame member to enable the bracket to be secured to, and depending from, said frame member such that the dependent end of the bracket may locate within, and be secured to, the end of the first tubular frame member.

Preferably, the bracket will depend perpendicularly from the edge of the second frame member such that the joint formed will be at right angles, but it is also possible to form the bracket such that it locates at any desired angle with respect to the second frame member thereby producing a joint of any required angle.

Preferably, the second frame member is provided with recesses, and the coupling means further comprises a projection on each arm which is locatable within the recess so as to positively locate the bracket with respect to the second frame member. The recess on the second frame member may comprise a channel that extends along the length of the frame member on each side thereof. This then enables the bracket to be located at any desired position along the length of the second frame member.

In one aspect of this invention the second frame member comprises a tubular member having either a substantially rectangular or square cross-section. Two of the opposing sides of the second frame member each have a pair of channels formed therein which extend along the length of each of the sides, wherein a channel is located adjacent each edge of each of the sides. However, it should be realised that the invention is applicable to frame members having a great variety of cross-sectional shapes, such as circular.

In respect of a tubular section having a substantially rectangular cross-section, then major axis of the section is normally positioned vertically for maximum strength, and therefore the channels would be formed in the sides of the frame member. This then enables the bracket to be connected either above or below the second frame member.

Preferably, the channels have a semi-circular cross-section, and the projections in the couplings have a similar cross-sectional shape so as to positively locate within the channels. Further, the sides of the bracket are recessed inwardly with respect to the coupling means such that when the first tubular member locates over the dependent end of the bracket, the respective aligning sides of the first and second frame members are flush with one another.

Preferably, the connector bracket is secured to the second frame member via threaded fasteners, and apertures are provided within the coupling means which enable location of these threaded fasteners. Further, cover plates may be located over each of the coupling means so as to improve the appearance of the coupling between the first and second frame members. The cover plates may be moulded from plastic material, and may be designed so as to provide a smooth appearance between the end of the first frame member and the side of the second frame member.

One advantage of the invention is that the bracket may be self-aligning when it is attached to the second frame member. That is the projections engage within the recesses or panels, and thereby align the bracket in the correct orientation with respect to the second frame member. Further, as the dependent end of the bracket locates into the end of the first tubular member, it is possible to obtain a secure fastening of the bracket to the second frame member without the use of any additional fasteners. This is due to the fact that the side arms of the brackets are unable to spread once the bracket is located within the end of the first tubular member. In addition, the location of the dependent end of the bracket into the end of the tubular member prevents the side arms from spreading, and the arrangement tends to ensure that the side arms are held positively against the second frame member. This results in a join having a high degree of strength which will positively resist movement of the first frame member relative to the second frame member in the axial plane parallel with the longitudinal axis of the second frame member, and in the plane normal to the longitudinal axis of the second frame member.

Finally, if threaded fasteners are to be located through the end of the first frame member and into the sides of the bracket, then the arrangement will prevent deflection of the side arms away from the walls of the first tubular member should self-tapping and self-drilling threaded fasteners be used or during the drilling of the required aperture.

In order to fully understand the invention, a preferred embodiment will now be described, however it should be realised that the invention is not to be confined or restricted to the precise details of the embodiment described.

This embodiment is illustrated in the accompanying representations in which:

FIG. 1 shows a perspective view of a connector bracket,

FIG. 2 shows a cross-sectional view of a connector bracket attached to a second frame member, and a first frame member attached to the dependent end of the connector bracket, and FIG. 3 shows a cover plate located over a coupling means of the connector bracket.

In this embodiment, the connector bracket 10 comprises a pair of side arms 11 and an end member 12 which form a substantially U-shaped connector bracket 10. In this embodiment, the connector bracket 10 is formed from a strip of metal which is folded to the desired shape.

At the end of each side arm 11, there is formed a coupling means 13. The end of each side arm 11 is formed into a corrugated surface shape, so as to produce divergent ends 14 and projections 15.

In order to assist in load distribution, and so as to form an integral washer, the ends of the side arms 11 are folded over on themselves so as to provide a double thickness of material for the projections 15.

As can be seen in the assembled view in FIG. 2, a first frame member which in this embodiment is a post 16 is secured to a second frame member which in this embodiment is a beam 17. As can be seen, the beam 17 is provided with a pair of elongate channels 18 on each side wherein the channels 18 are positioned towards the edge of each side. The channels 18 have a semi-circular cross-section, and the projections 15 also have a corresponding semi-circular cross-section. This allows the coupling means 13 to secure the connector bracket 10 to the beam 17.

In locating the connector bracket 10 to the beam 17, the open end of the connector bracket 10 is pushed against the beam 17, and the diverging ends 14 act to assist in spreading the side arms 11. The connector bracket 10 is then pushed onto the beam 17 until projections 15 locate within the channels 18. Once the projections 15 locate within the channels 18, due to the length of the projections 15, the bracket is then automatically aligned into the required position. In this embodiment, the connector bracket 10 depends from the beam 17 so as to form a right angled connection.

In order to securely attach the connector bracket 10 to the beam 17, apertures 19 are provided, and self-tapping and self-drilling screws may be used to secure the connector bracket 10 to the beam 17.

Once the connector bracket 10 is securely attached to the beam 17, the open end of the post 16 may be located over the dependent end of the connector bracket 10. Preferably, the dimensions of the connector bracket 10 are sized so as to provide a sliding fit into the end of the post 16. Once the post 16 is located over the end of the connector bracket 10, the side arms 11 are thereby prevented from spreading or opening, and due to the location of the projections 15 with the channels 18, the connector bracket 10 is then securely located to the beam 17 regardless whether or not threaded fasteners are used. This particular aspect of the invention enables structures to be assembled into an erected state without the need to progressively permanently fix the various frame members.

In order to secure the post 16 to the dependent end of the connector bracket 10, threaded fasteners may be secured through the end of the post 16 into the side arms 11. As the ends of the side arms 11 are held secure by the coupling means 13 to the beam 17, the use of self-tapping and self-drilling threaded fasteners will not cause any deflection or movement of the side arms 11 enabling proper location of the threaded fasteners.

As can be seen in FIG. 2, the coupling means 13 is positioned with respect to the side arms 11 such that when the post 16 is located over the dependent end of the connector bracket 10, the aligning sides 20 of the post and beam 16 and 17 are flush with respect to one another.

Further, the connector bracket 10 may be provided with webs 21 which improve the rigidity and strength of the connector bracket 10.

In order to improve the finished appearance of the connection, a cover plate 22 which is moulded from plastic, is designed to be secured over the coupling means 13. The cover plate 22 is shaped so as to abut against the end of the post 16, and to locate around the lower edge of the beam 17 and within the channel 18 so as to result in a fitment to both the post and beam 16 and 17 which has no gaps or apertures around the edge of the cover plate 22.

In order to secure the cover plate 22 to the coupling means 13, an additional pair of apertures 23 are provided in the side arms 11, and the cover plate 22 is provided with posts 24 which locate within the apertures 23. The diameters of the post 24 are such that there is an interference fit between the post 24 and the apertures 23 so as to firmly hold the cover plate 22 in place.

As will be seen from the above description, the invention provides a connector bracket 10 which not only allows the post 16 to be secured thereto, but also provides a clamping action which holds the connector bracket 10 to the beam 17. This therefore provides a much more secure fastening which is able to support both compressive and tensile loads. In addition, the connection is easier to fit, and allows a neat and clean appearance when the cover plate 22 is fitted.

We claim:

1. A connector bracket for connecting an end of a first tubular frame member to a second frame member having two opposite sides and a pair of elongate recesses respectively located in and extending along said opposite sides, the connector bracket comprising a U-shaped connector bracket having a pair of side arms and an end member extending between a first end of each said side arm at a dependent end of the bracket, which dependent end may be located within the end of said first tubular frame member, and coupling means at a second end of each said side arm comprising a projection, each said projection directed inwardly, towards one another, said projections of said pair of sidearms being securable concurrently to said two opposite sides of the second frame member by each said projection being located within a respective said recess of the second frame member.

2. A connector bracket according to claim 1 wherein the second frame member comprises a tubular member having a substantially rectangular cross-section with two opposing sides of said second frame member each having a pair of channels extending along the length of each said side, a channel being located adjacent each edge of said sides.

3. A connector bracket according to claim 1 wherein the second frame member comprises a tubular member having a substantially square cross-section with two opposing sides of said second frame member each having a pair of channels extending along the length of each said side, a channel being located adjacent each edge of said sides.

4. A connector bracket according to claim 1 wherein said channel has a semi-circular cross-section, and said projections have a semi-circular cross-section that locates within said channel.

5. A connector bracket according to claim 1 wherein the coupling means is shaped to enable said first tubular frame member to locate over the dependent end of the bracket such that the two opposite sides of said second frame member are flush with the end of the first frame member.

6. A connector bracket according to claim 1 further comprising a cover plate locatable over each of said coupling means.

* * * * *